(12) United States Patent
Koshizen

(10) Patent No.: US 9,972,203 B2
(45) Date of Patent: May 15, 2018

(54) DRIVING ASSISTANCE METHOD, PROGRAM, AND DRIVING ASSISTANCE APPARATUS

(71) Applicant: HONDA MOTOR CO., LTD., Tokyo (JP)

(72) Inventor: Takamasa Koshizen, Wako (JP)

(73) Assignee: HONDA MOTOR CO., LTD., Tokyo (JP)

(*) Notice: Subject to any disclaimer, the term of this patent is extended or adjusted under 35 U.S.C. 154(b) by 0 days. days.

(21) Appl. No.: 15/133,875

(22) Filed: Apr. 20, 2016

(65) Prior Publication Data

US 2016/0314687 A1 Oct. 27, 2016

(30) Foreign Application Priority Data

Apr. 21, 2015 (JP) ................. 2015-086715

(51) Int. Cl.
| | | |
|---|---|---|
| G08G 1/01 | (2006.01) |
| G08G 1/052 | (2006.01) |
| B60W 40/10 | (2012.01) |
| G08G 1/0967 | (2006.01) |

(52) U.S. Cl.
CPC .......... *G08G 1/0133* (2013.01); *B60W 40/10* (2013.01); *G08G 1/0112* (2013.01); *G08G 1/0141* (2013.01); *G08G 1/052* (2013.01); *G08G 1/096716* (2013.01); *G08G 1/096741* (2013.01); *G08G 1/096775* (2013.01)

(58) Field of Classification Search
CPC ................. G08G 1/0133; G08G 1/052; G08G 1/096775; G08G 1/0141; G08G 1/096716; G08G 1/096741; G08G 1/0112; B60W 40/10
See application file for complete search history.

(56) References Cited

U.S. PATENT DOCUMENTS

2013/0103294 A1* 4/2013 Koshizen ............... B60K 37/02
701/118

FOREIGN PATENT DOCUMENTS

| WO | 2012/002097 A1 | 1/2012 |
| WO | 2012/002099 A1 | 1/2012 |
| WO | 2014136949 A1 | 9/2014 |

* cited by examiner

*Primary Examiner* — Yuen H Wong
(74) *Attorney, Agent, or Firm* — Westerman, Hattori, Daniels & Adrian, LLP

(57) ABSTRACT

A driving assistance method includes: a step of, by a driving assistance apparatus, calculating a power spectrum by a frequency analysis of an acceleration obtained by a three-dimensional accelerometer; a step of, by the driving assistance apparatus, obtaining information on an angle based on a magnitude of an inclination of a single regression line of the power spectrum in a predetermined frequency range; a step of obtaining a speed by the driving assistance apparatus; a step of, by the driving assistance apparatus, calculating a traffic jam sign index as a product of a value associated with a degree of variation in the angle and a value associated with the speed; and a step of, by the driving assistance apparatus, sensing a traffic jam sign based on a change in the traffic jam sign index within a predetermined time.

15 Claims, 10 Drawing Sheets

DRIVING ASSISTANCE METHOD, PROGRAM, AND DRIVING ASSISTANCE APPARATUS

CROSS REFERENCES TO RELATED APPLICATIONS

The present application claims priority under 35 U.S.C. § 119 to Japanese Patent Application No. 2015-086715, filed Apr. 21, 2015, entitled "Driving Assistance Method, Program, and Driving Assistance Apparatus." The contents of this application are incorporated herein by reference in their entirety.

BACKGROUND

1. Field

The present disclosure relates to a driving assistance method, a program, and a driving assistance apparatus.

2. Description of the Related Art

Heretofore, there has been known a method in which a single regression analysis is performed on a power spectrum of acceleration of a vehicle, a single regression line is calculated, and a traffic jam sign is sensed based on whether or not a value (for example, an inclination local maximum and angle, etc.) associated with an inclination of the single regression line exceeds a predetermined threshold. (For example, refer to International Publication Nos. 2012-002097, 2012-002099, and 2014-136949.)

SUMMARY

However, when the method for sensing a traffic jam sign according to the above-described related art is actually applied to a traveling vehicle according to various traveling environments and driver's driving characteristics and the like, the sensing accuracy of the traffic jam sign may vary. The various traveling environments include, for example, a traveling state, a road condition, a road type, and a flow of plural vehicles. The inclination of the single regression line calculated from the power spectrum of the acceleration may be prone to vary according to the various traveling environments and driver's driving characteristics and the like, which in turn may render it difficult to set a threshold applicable across the board to the value associated with the inclination. Thus, for sensing the traffic jam sign based on the various traveling environments and driver's driving characteristics and the like, it is desired to ensure a desired sensing accuracy and reliability.

The present application has been made in view of the above circumstances. The present application describes a driving assistance method, a program, and a driving assistance apparatus, which are capable of ensuring a desired sensing accuracy and reliability for sensing the traffic jam sign based on the various traveling environments and driver's driving characteristics and the like.

In order to solve the above-mentioned problems, the embodiment adopts the following aspects.

(1) A driving assistance method according to one aspect of the embodiment, which is executed by electronic equipment (for example, a driving assistance apparatus 10 in the embodiment) including an acceleration obtaining unit (for example, a three-dimensional accelerometer 14 in the embodiment) configured to obtain an acceleration and an information presentation unit (for example, a display device 16 in the embodiment) configured to present information, includes: a power spectrum calculation step (for example, steps S02 and S03 in the above-mentioned embodiment) of, by the electronic equipment, calculating a power spectrum corresponding to a frequency by a frequency analysis of the acceleration obtained by the acceleration obtaining unit; an angle information obtaining step (for example, step S04 in the above-mentioned embodiment) of, by the electronic equipment, calculating a single regression line of the power spectrum, and obtaining information on an angle based on a magnitude of an inclination of the single regression line in a predetermined frequency range; a speed obtaining step (for example, step S05 in the above-mentioned embodiment) of obtaining a speed by the electronic equipment; a traffic jam sign index calculation step (for example, steps S06 to S08 in the above-mentioned embodiment) of, by the electronic equipment, calculating a traffic jam sign index as a product of a value associated with a degree of variation in the angle and a value associated with the speed; a traffic jam sign sensing step (for example, step S09 in the above-mentioned embodiment) of, by the electronic equipment, sensing a traffic jam sign based on a change in the traffic jam sign index within a predetermined time; and an information presentation step (for example, steps S10 and S11 in the above-mentioned embodiment) of, by the information presentation unit, presenting traffic jam sign information based on the traffic jam sign sensed by the electronic equipment in the traffic jam sign sensing step (the term "sense" or "sensing" used in this application means detection of a traffic jam sign that indicates the probability of traffic jam as predication).

(2) The driving assistance method according to (1) may include an acceleration obtaining step (for example, step S01 in the above-mentioned embodiment) of, by the acceleration obtaining unit, obtaining information on accelerations in axial directions of first to third axes which form orthogonal coordinate systems in a three-dimensional space, and in the power spectrum calculation step, the electronic equipment may calculate vectors of the accelerations in the three-dimensional space by using the information on the accelerations in the axial directions, calculate as input data a norm of a difference between the vectors at two different times, calculate an autocorrelation of the input data, and perform a Fourier transform on the autocorrelation, thereby calculating the power spectrum.

(3) In the driving assistance method according to (1) or (2), in the traffic jam sign sensing step, the electronic equipment may sense the traffic jam sign if the traffic jam sign index is equal to or more than a predetermined value within the predetermined time.

(4) In the driving assistance method according to (1) or (2), in the traffic jam sign sensing step, the electronic equipment may sense the traffic jam sign if the traffic jam sign index decreases by a predetermined rate or more within the predetermined time.

(5) In the driving assistance method according to (1) or (2), in the traffic jam sign sensing step, the electronic equipment may sense the traffic jam sign if the traffic jam sign index becomes a local maximum within the predetermined time.

(6) A program according to one aspect of the embodiment causes a computer of electronic equipment to execute steps. The electronic equipment (for example, the driving assistance apparatus 10 in the embodiment) includes an acceleration obtaining unit (for example, the three-dimensional accelerometer 14 in the embodiment) configured to obtain an acceleration and an information presentation unit (for example, the display device 16 in the embodiment) configured to present information. The steps include: a power spectrum calculation step (for example, steps S02 and S03 in the above-mentioned embodiment) of calculating a power spectrum corresponding to a frequency by a frequency analysis of the acceleration obtained by the acceleration obtaining unit; an angle information obtaining step (for example, step S04 in the above-mentioned embodiment) of calculating a single regression line of the power spectrum, and obtaining information on an angle based on a magnitude of an inclination of the single regression line in a predetermined frequency range; a speed obtaining step (for example, step S05 in the above-mentioned embodiment) of obtaining a speed; a traffic jam sign index calculation step (for example, steps S06 to S08 in the above-mentioned embodiment) of calculating a traffic jam sign index as a product of a value associated with a degree of variation in the angle and a value associated with the speed; a traffic jam sign sensing step (for example, step S09 in the above-mentioned embodiment) of sensing a traffic jam sign based on a change in the traffic jam sign index within a predetermined time; and an information presentation step (for example, steps S10 and S11 in the above-mentioned embodiment) of causing the information presentation unit to present traffic jam sign information based on the traffic jam sign sensed in the traffic jam sign sensing step.

(7) In the program according to (6), the program may cause the computer of the electronic equipment to execute an acceleration obtaining step (for example, step S01 in the above-mentioned embodiment) of causing the acceleration obtaining unit to obtain information on accelerations in axial directions of first to third axes which form orthogonal coordinate systems in a three-dimensional space, and to, in the power spectrum calculation step, calculate vectors of the accelerations in the three-dimensional space by using the information on the accelerations in the axial directions, calculate as input data a norm of a difference between the vectors at two different times, calculate an autocorrelation of the input data, and perform a Fourier transform on the autocorrelation, thereby calculating the power spectrum.

(8) In the program according to (6) or (7), the program may cause the computer of the electronic equipment to, in the traffic jam sign sensing step, sense the traffic jam sign if the traffic jam sign index is equal to or more than a predetermined value within the predetermined time.

(9) In the program according to (6) or (7), the program may cause the computer of the electronic equipment to, in the traffic jam sign sensing step, sense the traffic jam sign if the traffic jam sign index decreases by a predetermined rate or more within the predetermined time.

(10) In the program according to (6) or (7), the program may cause the computer of the electronic equipment to, in the traffic jam sign sensing step, sense the traffic jam sign if the traffic jam sign index becomes a local maximum within the predetermined time.

(11) A driving assistance apparatus according to one aspect of the embodiment includes: an acceleration obtaining unit (for example, the three-dimensional accelerometer 14 in the embodiment) configured to obtain an acceleration; an information presentation unit (for example, the display device 16 in the embodiment) configured to present information; a power spectrum calculator (for example, a frequency analyzer 22 in the embodiment) configured to calculate a power spectrum corresponding to a frequency by a frequency analysis of the acceleration obtained by the acceleration obtaining unit; an angle information obtaining unit (for example, a single regression line calculator 23 in the embodiment) configured to calculate a single regression line of the power spectrum and obtain information on an angle based on a magnitude of an inclination of the single regression line in a predetermined frequency range; a speed obtaining unit (for example, a speed calculator 20 in the embodiment) configured to obtain a speed; a traffic jam sign index calculator (for example, a traffic jam sign index calculator 24 in the embodiment) configured to calculate a traffic jam sign index as a product of a value associated with a degree of variation in the angle and a value associated with the speed; and a traffic jam sign sensor (for example, a traffic jam prediction unit 25 in the embodiment) configured to sense a traffic jam sign based on a change in the traffic jam sign index within a predetermined time. The information presentation unit presents traffic jam sign information based on the traffic jam sign sensed by the traffic jam sign sensor.

(12) In the driving assistance apparatus according to (11), the acceleration obtaining unit may obtain information on accelerations in axial directions of first to third axes which form orthogonal coordinate systems in a three-dimensional space, and the power spectrum calculator may calculate vectors of the accelerations in the three-dimensional space by using the information on the accelerations in the axial directions, calculate as input data a norm of a difference between the vectors at two different times, calculate an autocorrelation of the input data, and perform a Fourier transform on the autocorrelation, thereby calculating the power spectrum.

(13) In the driving assistance apparatus according to (11) or (12), the traffic jam sign sensor may sense the traffic jam sign if the traffic jam sign index is equal to or more than a predetermined value within the predetermined time.

(14) In the driving assistance apparatus according to (11) or (12), the traffic jam sign sensor may sense the traffic jam sign if the traffic jam sign index decreases by a predetermined rate or more within the predetermined time.

(15) In the driving assistance apparatus according to (11) or (12), the traffic jam sign sensor may sense the traffic jam sign if the traffic jam sign index becomes a local maximum within the predetermined time.

According to (1), (6) or (11), the use of the traffic jam sign index having higher usefulness and stability for the sensing of the traffic jam sign, rather than an index susceptible to disturbance such as various traveling environments and driver's driving characteristics, enables simply ensuring a desired sensing accuracy and reliability. The traffic jam sign index as the product of the value associated with the degree of variation in the angle and the value associated with the speed is an index which is unsusceptible to disturbance such as various traveling environments and driver's driving characteristics and is superior in sensitivity to the traffic jam sign, and can improve the sensing accuracy and reliability of the traffic jam sign.

Further, in the case of (2), (7) or (12), the use of the acceleration vector in the three-dimensional space, which exhibits a sharper change for the traffic jam sign, enables improving resistance of the sensing of the traffic jam sign to the disturbance and thus improving the sensing accuracy, as compared to the use of information on acceleration only in a single axial direction or axial directions in a plane. The norm of the difference between the acceleration vectors at two different times is used as input data for frequency analysis thereby to enable performing proper frequency analysis for acceleration generated in the electronic equipment, regardless of the position and attitude of the electronic equipment. Using an output from the three-dimensional accelerometer mounted as a standard in electronic equipment such for example as a portable information terminal and a mobile telephone terminal enables simply and accurately grasping behavior of a vehicle moving together with the electronic equipment, and thus enables improving convenience.

Further, in the case of (3), (8) or (13), each of the degree of variation in the angle and the speed changes to a tendency to increase due to the traffic jam sign, and thus, a state in which the traffic jam sign index is equal to or more than the predetermined value is brought into correspondence with the traffic jam sign thereby to enable simply and accurately sensing the traffic jam sign.

Further, in the case of (4), (9) or (14), each of the degree of variation in the angle and the speed sharply decreases in a state immediately before the traffic jam, and thus, a state in which the traffic jam sign index decreases by the predetermined rate or more is brought into correspondence with the traffic jam sign thereby to enable simply and accurately sensing the traffic jam sign.

Further, in the case of (5), (10) or (15), each of the degree of variation in the angle and the speed becomes the local maximum due to the traffic jam sign, and thus, a state in which the traffic jam sign index becomes the local maximum is brought into correspondence with the traffic jam sign thereby to enable simply and accurately sensing the traffic jam sign. Since the occurrence of the traffic jam is periodic, the traffic jam sign index is calculated at certain time intervals and the local maximum is extracted from a history of the traffic jam sign index, thereby to enable simply sensing the traffic jam sign.

DESCRIPTION OF THE PREFERRED EMBODIMENTS

Figure 1:
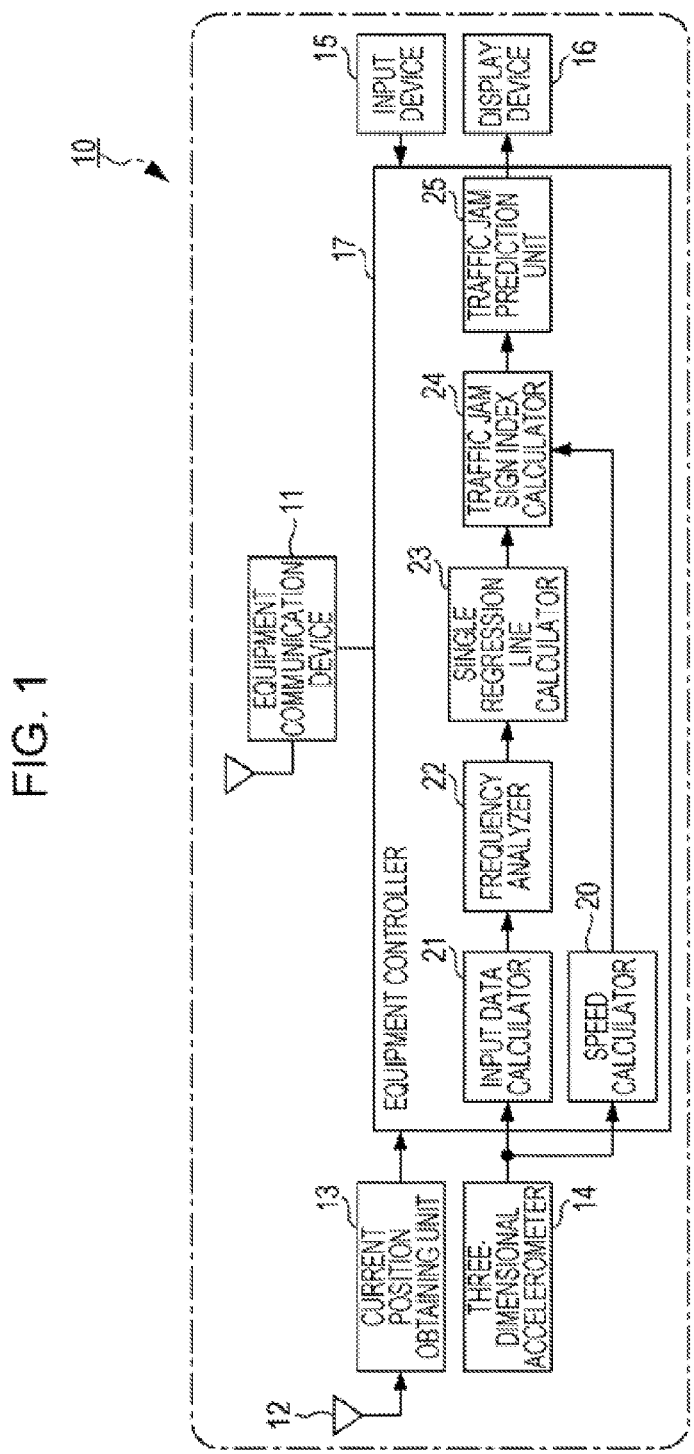
FIG. 1 is a block diagram of a driving assistance apparatus for implementing a driving assistance method according to an embodiment.

One embodiment of a driving assistance method, a program, and a driving assistance apparatus will be described below with reference to the accompanying drawings.

A driving assistance apparatus 10 according to the embodiment is, for example, a portable terminal carried by an occupant in a mobile unit such as a vehicle, information equipment detachably mounted on the mobile unit such as the vehicle, electronic equipment such as a navigation device preinstalled in the mobile unit such as the vehicle, or the like.

The driving assistance apparatus 10 is capable of two-way communication with an external device by a radio network via a communication network in ad hoc mode, infrastructure mode or the like. For example, the driving assistance apparatus 10 performs two-way communication with the driving assistance apparatus 10 of another vehicle by communication between vehicles in the ad hoc mode. For example, the driving assistance apparatus 10 performs two-way communication with the external device via a base station by radio communication in the infrastructure mode.

The driving assistance apparatus 10 includes an equipment communication device 11, a positioning signal receiver 12, a current position obtaining unit 13, a three-dimensional accelerometer 14, an input device 15, a display device 16, and an equipment controller 17.

The equipment communication device 11 can communicate with an external device via various radio communication network systems, and transmits and receives various signals. Note that communication between the driving assistance apparatus 10 and the external device is not limited to the above-described form of communication, and other communications such for example as communication via a communication satellite may be adopted.

The positioning signal receiver 12 receives a positioning signal for use in a positioning system (for example, Global Positioning System (GPS), Global Navigation Satellite System (GNSS), or the like) for measuring the position of the driving assistance apparatus 10 by utilizing an artificial satellite, for example.

The current position obtaining unit 13 detects the current position of the driving assistance apparatus 10 by using the positioning signal received by the positioning signal receiver 12.

The three-dimensional accelerometer 14 is a three-axes accelerometer in which the so-called number of detection axes is three, or the like. In a predetermined sampling period, the three-dimensional accelerometer 14 detects acceleration generated in the driving assistance apparatus 10, as accelerations in axial directions of an X axis, a Y axis and a Z axis which form orthogonal coordinate systems in a three-dimensional space. The three-dimensional accelerometer 14 is mounted as a standard for example in electronic equipment such as a portable information terminal or a mobile telephone terminal carried by a vehicle driver.

The input device 15 includes, for example, a switch, a touch panel, a keyboard, a voice input device, and the like, and outputs signals according to various operator's input operations.

The display device 16 is, for example, various displays such as a liquid crystal display device, and displays various types of information outputted by the equipment controller 17.

The equipment controller 17 controls various operations of the driving assistance apparatus 10.

The equipment controller 17 includes a speed calculator 20, an input data calculator 21, a frequency analyzer 22, a single regression line calculator 23, a traffic jam sign index calculator 24, and a traffic jam prediction unit 25.

The speed calculator 20 calculates a speed V of the driving assistance apparatus 10 by using the accelerations in the axial directions of the X axis, the Y axis and the Z axis detected by the three-dimensional accelerometer 14.

The input data calculator 21 calculates a vector of acceleration (an acceleration vector A) in the three-dimensional space by using the accelerations in the axial directions of the X axis, the Y axis and the Z axis detected by the three-dimensional accelerometer 14. Then, a norm u of a difference (or an acceleration vector difference) ΔA between the acceleration vectors A at two different times with a time interval of a sampling period ΔT or the like therebetween is calculated as input data to be inputted to the frequency analyzer 22.

Figure 2:
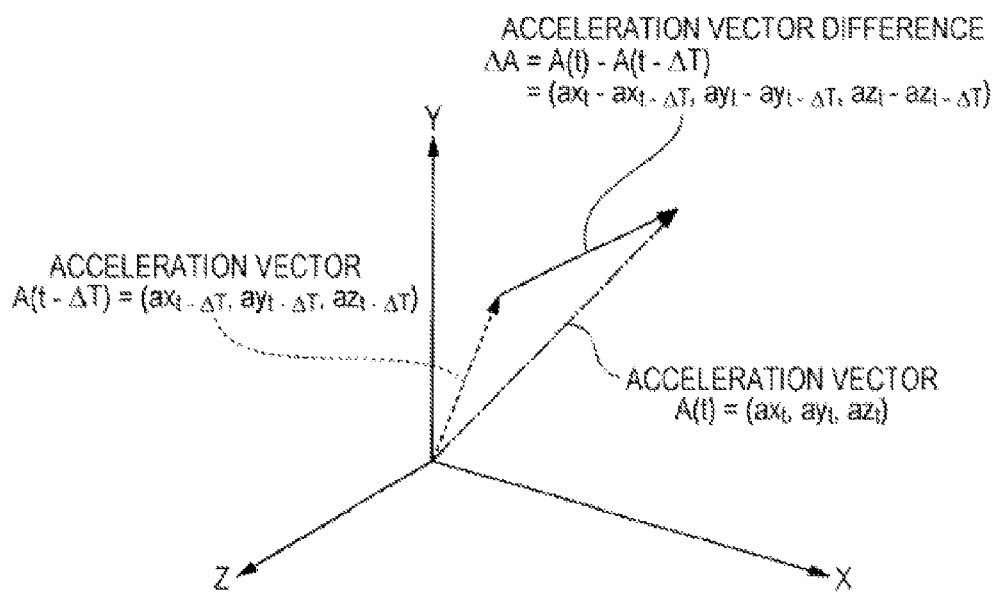
FIG. 2 is a graph illustrating an example of a difference of a vector of acceleration according to the embodiment.

As illustrated in FIG. 2, for example, the input data calculator 21 calculates the acceleration vector difference ΔA=A(t)−A(t−ΔT) from an acceleration vector A(t)=(ax$_t$, ay$_t$, az$_t$) at appropriate time t, and an acceleration vector A(t−ΔT)=(ax$_{t-\Delta T}$, ay$_{t-\Delta T}$, az$_{t-\Delta T}$) at time t-ΔT earlier than the time t by the sampling period ΔT. Then, a norm u$_t$ of the acceleration vector difference ΔA is calculated as represented by Equation (1).

Note that a buffer size of a buffer (not illustrated) capable of storing information on the accelerations in the axial directions of the X axis, the Y axis and the Z axis detected by the three-dimensional accelerometer 14, that is, the number of acceleration information samples, can be appropriately set by the operator, for example on an appropriate setting screen or the like displayed on the display device 16.

$$u_t = \sqrt{(ax_t - ax_{t-\Delta T})^2 + (ay_t - ay_{t-\Delta T})^2 + (az_t - az_{t-\Delta T})^2} \quad (1)$$

The frequency analyzer 22 performs frequency analysis on the input data calculated by the input data calculator 21, and calculates a power spectrum (or an acceleration spectrum) corresponding to the frequency.

For example, the frequency analyzer 22 calculates an autocorrelation of the input data by using an input/output point of the input data for the frequency analysis and a delay count of an autocorrelation. Then, a fast Fourier transform is performed on the autocorrelation to calculate the acceleration spectrum. Note that the input/output point of the input data for the frequency analysis and the delay count of the autocorrelation, and a selection of whether or not an average value is subtracted from an input value of the autocorrelation can be appropriately set by the operator, for example on an appropriate setting screen or the like displayed on the display device 16.

For example, the frequency analyzer 22 calculates the acceleration spectrum in a predetermined time period by performing the calculation of the autocorrelation and the fast Fourier transform for the input/output point of the input data calculated by input data calculator 21 in the sampling period ΔT.

The single regression line calculator 23 calculates a single regression line in a predetermined frequency range of the acceleration spectrum calculated by the frequency analyzer 22, and converts an inclination of the single regression line into information on an angle (or a spectrum angle) θ.

Figure 3:
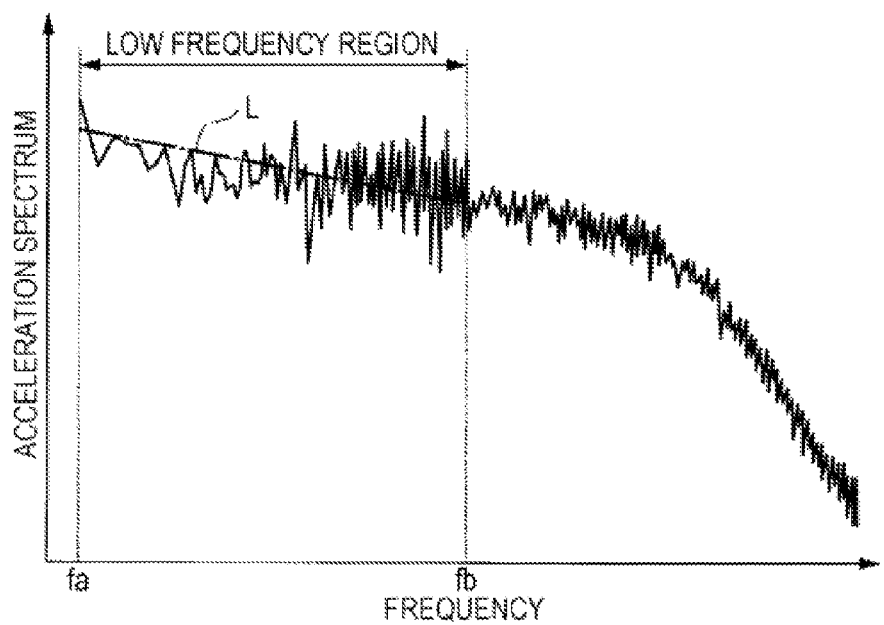
FIG. 3 is a graph illustrating an example of an acceleration spectrum according to the embodiment.

For example, according to a chaos theory, a traffic jam prediction is greatly affected by a power spectrum of a low frequency rather than a high frequency. Thus, as illustrated in FIG. 3, the single regression line calculator 23 calculates a single regression line L for the acceleration spectrum in a region of low frequencies equal to or lower than a predetermined frequency fb (for example, a region of frequencies which are equal to or higher than a lower limit frequency fa and are equal to or lower than the predetermined frequency fb), by a method of least squares or the like. Then, an inclination of the calculated single regression line L (i.e. an inclination with respect to a frequency axis direction, assuming that its inclination is zero) is converted into the information on the angle (or the spectrum angle) θ.

For example, as the spectrum angle θ increases in a negative direction (or a direction in which the acceleration spectrum decreases) (that is, as an absolute value of negative sign increases), a delay of dynamic time response of acceleration and deceleration changes to tend to increase, and speed variations increase. This renders it difficult to limit a driving region in which energy efficiency of the vehicle (such as fuel economy or power economy) is paramount, and thus, a traffic jam is prone to occur and the energy efficiency is reduced.

For example, a case where the absolute value of the spectrum angle θ is small corresponds to a case where a shock wave (vibration or wobble) received from a preceding vehicle by the vehicle moving together with the driving assistance apparatus 10 is small, and corresponds to a case where a response delay with respect to the preceding vehicle is small, synchronized travel having little influence on a traffic flow is easy, that is, the likelihood of a traffic jam occurring is small.

Conversely, a case where the absolute value of the spectrum angle θ is large corresponds to a case where the shock wave (the vibration or wobble) received from the preceding vehicle by the vehicle moving together with the driving assistance apparatus 10 is large, and corresponds to a case where the response delay with respect to the preceding vehicle is large, synchronized travel is difficult and the traffic flow is prone to be affected, that is, the likelihood of a traffic jam occurring is great. As employed herein, the shock wave (the vibration or wobble) means that the vehicle repeats acceleration and deceleration operations and thus propagates the operations (forward and backward movements) to a rearward vehicle as a form of vibration.

Moreover, if total power of acceleration and deceleration in a predetermined time period increases, the traffic flow is prone to occur and the energy efficiency of the vehicle (such as fuel economy or power economy) is reduced.

Figure 4:
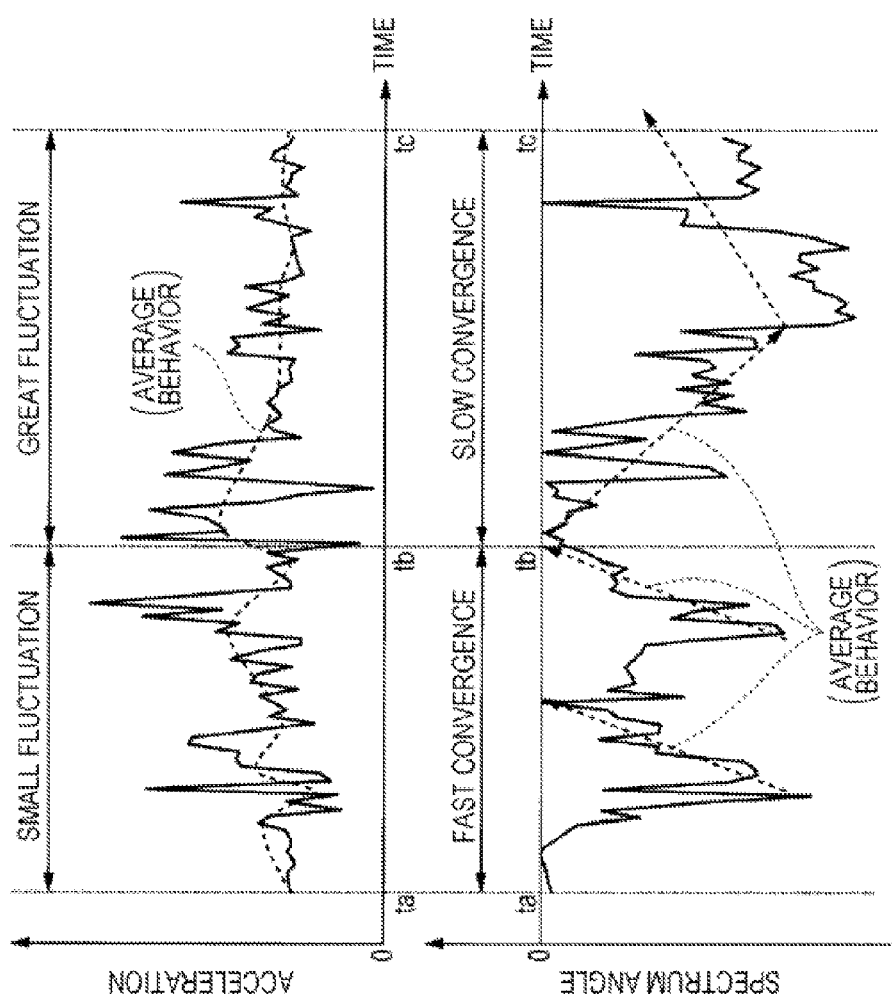
FIG. 4 is a graph illustrating examples of fluctuation and average behavior according to an acceleration and spectrum angle time according to the embodiment.

For example, when the vehicle moves from its stopped state to constant speed travel by appropriate acceleration, as indicated by fluctuations and average behavior of the acceleration and the spectrum angle θ in a time period between time ta and time tb illustrated in FIG. 4, or in other situations, the fluctuation in the acceleration is small. Then, even if the absolute value of the spectrum angle θ temporarily increases, it immediately converges toward zero, and thus, the total power of the acceleration and deceleration has a small value.

Moreover, when the vehicle performs the constant speed travel or gently decelerates by an engine brake or the like, as indicated by the fluctuations and average behavior of the acceleration and the spectrum angle θ in the time period between the time to and the time tb illustrated in FIG. 4, or in other situations, the fluctuation in the acceleration is small. Then, the absolute value of the spectrum angle θ maintains a small value, and thus, the total power of the acceleration and deceleration has a small value. In this case, even if the absolute value of the spectrum angle θ temporarily increases by vibration or the like, it immediately converges toward zero, and thus, the total power of the acceleration and deceleration has a small value. Moreover, even if the absolute value of the spectrum angle θ temporarily increases due to a detection error of the three-dimensional accelerometer 14, or the like, it immediately converges toward zero, and thus, the total power of the acceleration and deceleration has a small value.

Meanwhile, when the vehicle suddenly decelerates or decelerates immediately after acceleration, as indicated by the fluctuations and average behavior of the acceleration and the spectrum angle θ in a time period between the time tb and time tc illustrated in FIG. 4, or in other situations, the fluctuation in the acceleration is great. Then, the absolute value of the spectrum angle θ has a large value, and the time required to converge toward zero becomes long, and thus, the total power of the acceleration and deceleration has a large value.

The traffic jam sign index calculator 24 calculates an average value of the speed V as a value associated with the speed V calculated by the speed calculator 20. For example, the traffic jam sign index calculator 24 calculates an arithmetic mean μ (V) of the speed V in a predetermined time. The predetermined time is, for example, the order of a few minutes to a few tens of minutes.

The traffic jam sign index calculator 24 calculates a value associated with the degree of variation in the angle θ calculated by the single regression line calculator 23. For example, the traffic jam sign index calculator 24 calculates a variance σ (θ) of the angle θ in a predetermined time. The predetermined time is, for example, the order of a few minutes to a few tens of minutes.

The traffic jam sign index calculator 24 calculates the product of the arithmetic mean μ (V) of the speed V and the variance σ (θ) of the angle θ (=μ (V)×σ (θ)), as a traffic jam sign index I to be inputted to the traffic jam prediction unit 25, as represented by Equation (2).

$$I=\mu(V)\times\sigma(\theta) \quad (2)$$

The traffic jam prediction unit 25 senses a traffic jam sign indicating the likelihood of the traffic jam occurring in future or the likelihood that the traffic jam already occurred, according to the traffic jam sign index I calculated by the traffic jam sign index calculator 24. The degree of traffic jam sign indicating whether the degree of traffic jam sign is high or low is high when there is a high possibility of the traffic jam occurring forward in a travel direction of the vehicle moving together with the driving assistance apparatus 10, and the degree of traffic jam sign is low when there is a low possibility.

The traffic jam prediction unit 25 determines whether or not the traffic jam sign index I satisfies a predetermined condition, thereby to determine whether or not the energy efficiency of the vehicle (such as fuel economy or power economy) tends to decrease and whether or not the traffic jam is prone to occur. For example, the traffic jam prediction unit 25 determines whether or not the traffic jam sign index I is equal to or more than a predetermined value within a predetermined time. For example, the traffic jam prediction unit 25 determines whether or not the traffic jam sign index I decreases by a predetermined rate or more within a predetermined time. For example, the traffic jam prediction unit 25 determines whether or not the traffic jam sign index I becomes a local maximum within a predetermined time.

Note that data on a predetermined value for the magnitude of the traffic jam sign index I and a rate of decrease in the traffic jam sign index I can be appropriately set by the operator, for example on an appropriate setting screen or the like displayed on the display device 16.

Figure 5:
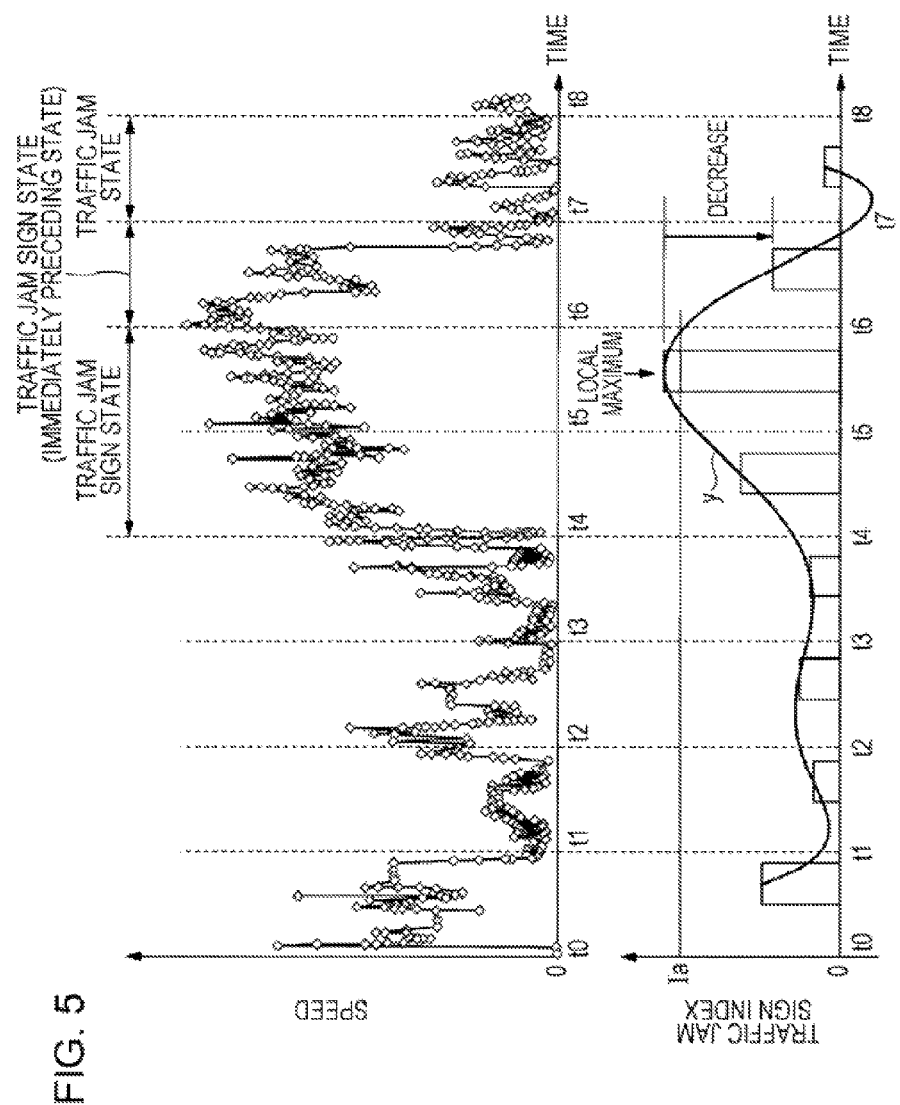
FIG. 5 is a graph illustrating examples of fluctuations in speed and a traffic jam sign index in a traffic jam sign state, an immediately preceding state and a traffic jam state according to the embodiment.

For example, as illustrated in FIG. 5, an increase in the speed V occurs after time t4 at which the traffic jam sign occurs, as compared to a state before the time t4 in which the traffic jam sign does not occur. Moreover, the degree of variation in the angle θ increases with an increase in variations in fluctuations in acceleration and deceleration, in a state in which the traffic jam sign occurs, as compared to the state in which the traffic jam sign does not occur. The increase in the speed V and the increase in the degree of variation in the angle θ involved in the occurrence of the traffic jam sign are not phenomena in which the presence or absence of the occurrence varies by the influence of disturbance such for example as various vehicle traveling environments and vehicle driver's driving characteristics. The increase in the speed V and the increase in the degree of variation in the angle θ involved in the occurrence of the traffic jam sign are phenomena which occur across the board, incident to the traffic jam sign, and are essential features possessed by the traffic jam sign. Therefore, the traffic jam prediction unit 25 determines that a state in which the traffic jam sign index I is equal to or more than a predetermined value Ia within a predetermined time, such for example as a time period between time t5 and time t6 is a state in which the traffic jam sign occurs (or a traffic jam sign state).

Moreover, as illustrated in FIG. 5, a decrease in the speed V occurs after time t6 which is a state immediately before the traffic jam in a time period between time t4 and time t7 which is the traffic jam sign state. Moreover, in the state immediately before the traffic jam, the degree of variation in the angle θ decreases with a decrease in variations in fluctuations in acceleration and deceleration. The decrease in the speed V and the decrease in the degree of variation in the angle θ in the state immediately before the traffic jam are not phenomena in which the presence or absence of the occurrence varies by the influence of disturbance such for example as various vehicle traveling environments and vehicle driver's driving characteristics. The decrease in the speed V and the decrease in the degree of variation in the angle θ in the state immediately before the traffic jam are phenomena which occur across the board in the state immediately before the traffic jam in the traffic jam sign, and are essential features possessed by the state immediately before the traffic jam. Therefore, the traffic jam prediction unit 25 determines that a state in which the traffic jam sign index I decreases by a predetermined rate or more within a predetermined time, such for example as a time period between time t6 and time t7 is a state in which the traffic jam sign occurs (or the traffic jam sign state).

Moreover, as illustrated in FIG. 5, the local maximum of the speed V occurs in the time period between the time t4 and the time t7 which is the traffic jam sign state. Moreover, in the traffic jam sign state, the local maximum of the degree of variation in the angle θ occurs incident to a decrease after an increase in variations in fluctuations in acceleration and deceleration. The local maximum of the speed V and the local maximum of the degree of variation in the angle θ in the traffic jam sign state are not phenomena in which the presence or absence of the occurrence varies by the influence of disturbance such for example as various vehicle traveling environments and vehicle driver's driving characteristics. The local maximum of the speed V and the local maximum of the degree of variation in the angle θ in the traffic jam sign state are phenomena which occur across the board in the traffic jam sign, and are essential features possessed by the traffic jam sign. Therefore, the traffic jam prediction unit 25 determines that a state in which the traffic jam sign index I becomes the local maximum within a predetermined time, such for example as the time period between the time t4 and the time t7 is a state in which the traffic jam sign occurs (or the traffic jam sign state).

The traffic jam prediction unit 25 determines whether or not the traffic jam sign index I is equal to or more than the predetermined value Ia within each predetermined time, based on time series data of the traffic jam sign index I sequentially calculated by the traffic jam sign index calculator 24. The traffic jam prediction unit 25 determines that the traffic jam sign is sensed, if the traffic jam sign index I is equal to or more than the predetermined value Ia, such for example as a time period between time t5 and time t6 illustrated in FIG. 6.

Figure 7:
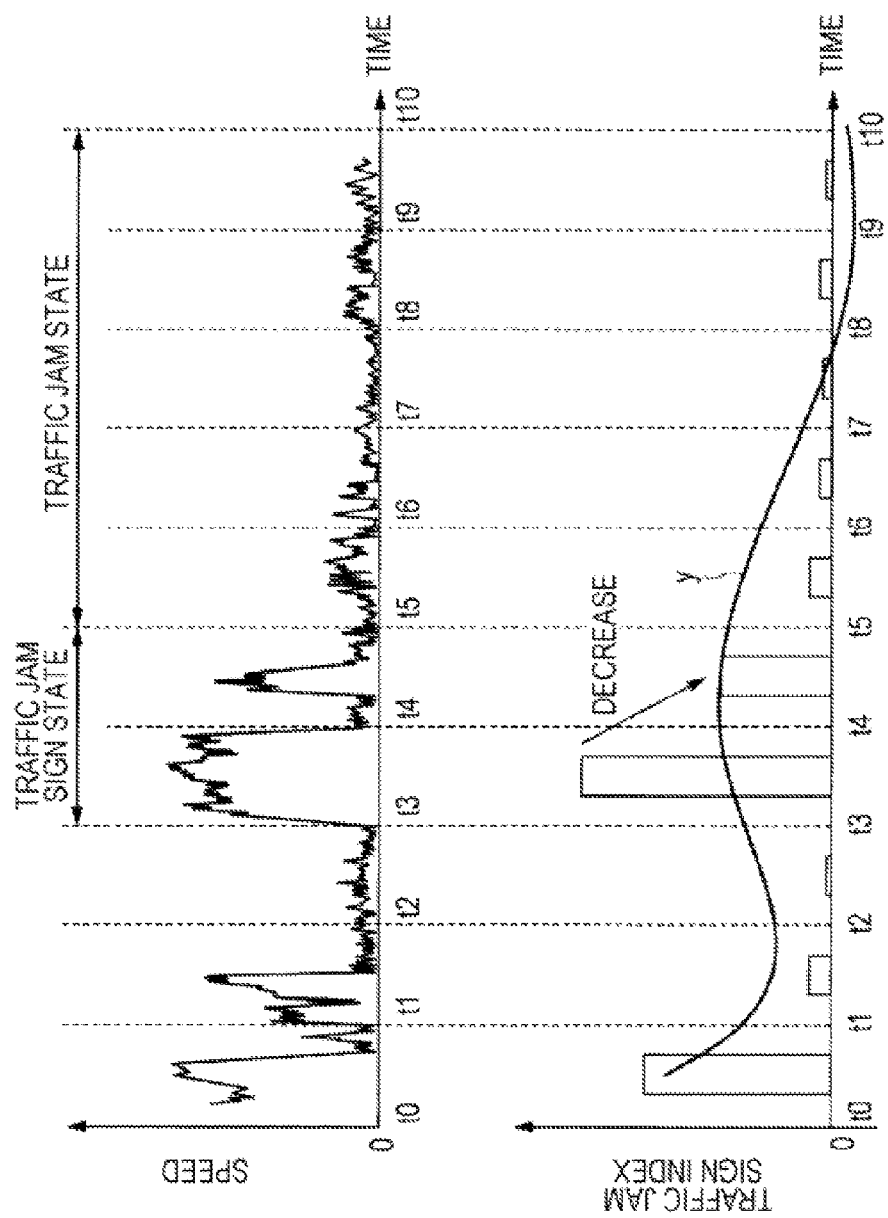
FIG. 7 is a graph illustrating examples of a traffic jam sign sensing state and a traffic jam state in fluctuations in the speed and the traffic jam sign index according to the embodiment.

Moreover, the traffic jam prediction unit 25 determines whether or not the traffic jam sign index I decreases by the predetermined rate or more within each predetermined time, based on time series data of the traffic jam sign index I sequentially calculated by the traffic jam sign index calculator 24. The traffic jam prediction unit 25 determines that the traffic jam sign is sensed, if the traffic jam sign index I decreases by the predetermined rate or more, such for example as a time period between time t3 and time t5 illustrated in FIG. 7.

Moreover, the traffic jam prediction unit 25 determines whether or not the local maximum exists, by assigning a curve function (y) having time (x) or the like as a variable to time series data of the traffic jam sign index I sequentially calculated by the traffic jam sign index calculator 24, for example by using an n-th order function of an arbitrary natural number n equal to or more than 2, or the like. The traffic jam prediction unit 25 determines that the traffic jam sign is sensed, if the time series data of the traffic jam sign index I is the local maximum, such for example as a time period between time t1 and time t4 illustrated in FIG. 6.

Figure 6:
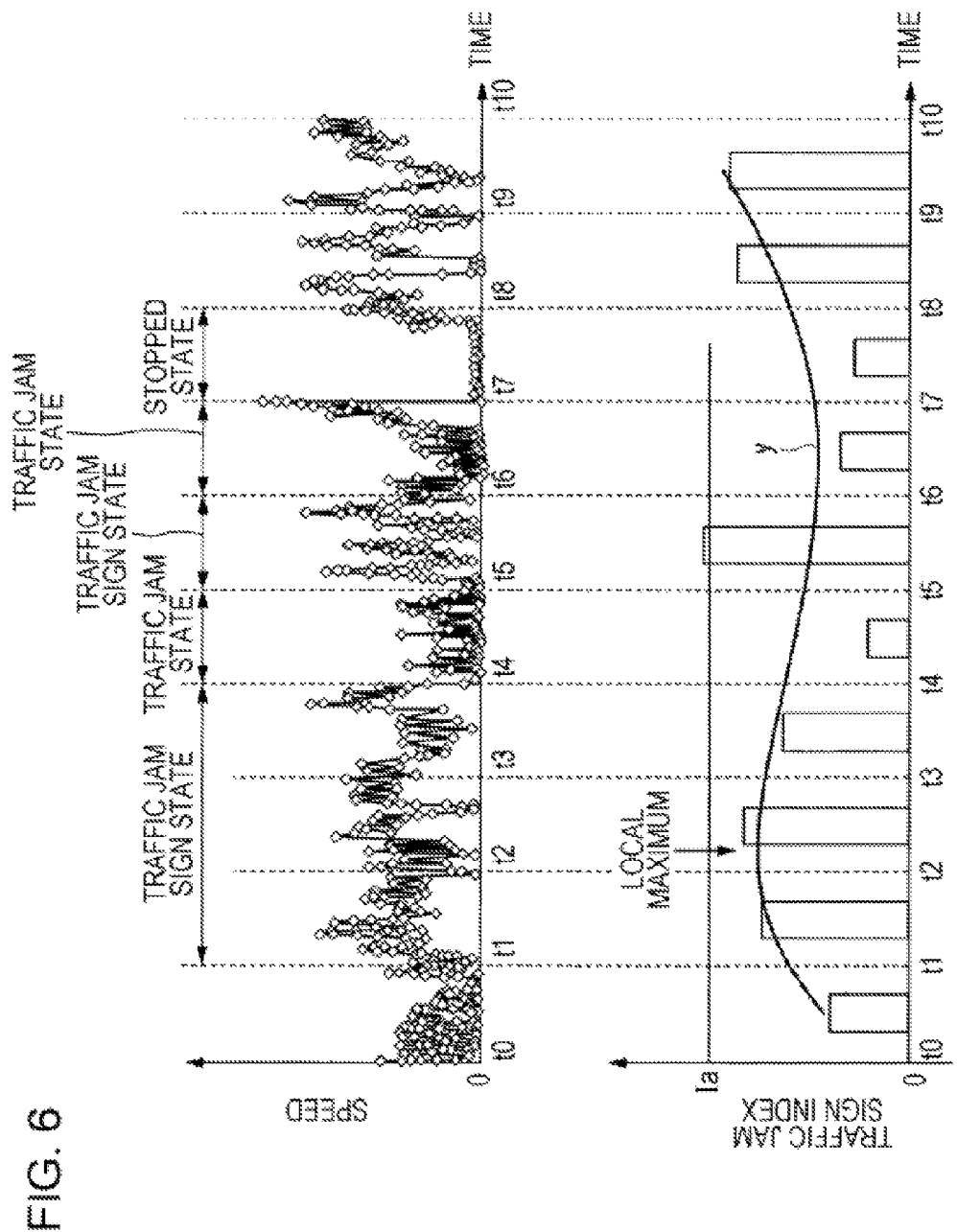
FIG. 6 is a graph illustrating examples of a traffic jam sign sensing state and a traffic jam state in fluctuations in the speed and the traffic jam sign index according to the embodiment.

In the stopped state of the vehicle caused by a traffic signal mechanism, such for example as a time period between time t7 and time t8 illustrated in FIG. 6, a characteristic phenomenon like the predetermined condition satisfied by the traffic jam sign index I in the traffic jam sign state is not observed, and thus, the stopped state is clearly discriminated from the traffic jam state.

The driving assistance apparatus 10 for implementing the driving assistance method according to the embodiment includes the above-described configuration, and next, description will be given with regard to operation of the driving assistance apparatus 10, that is, the driving assistance method.

Figure 8:
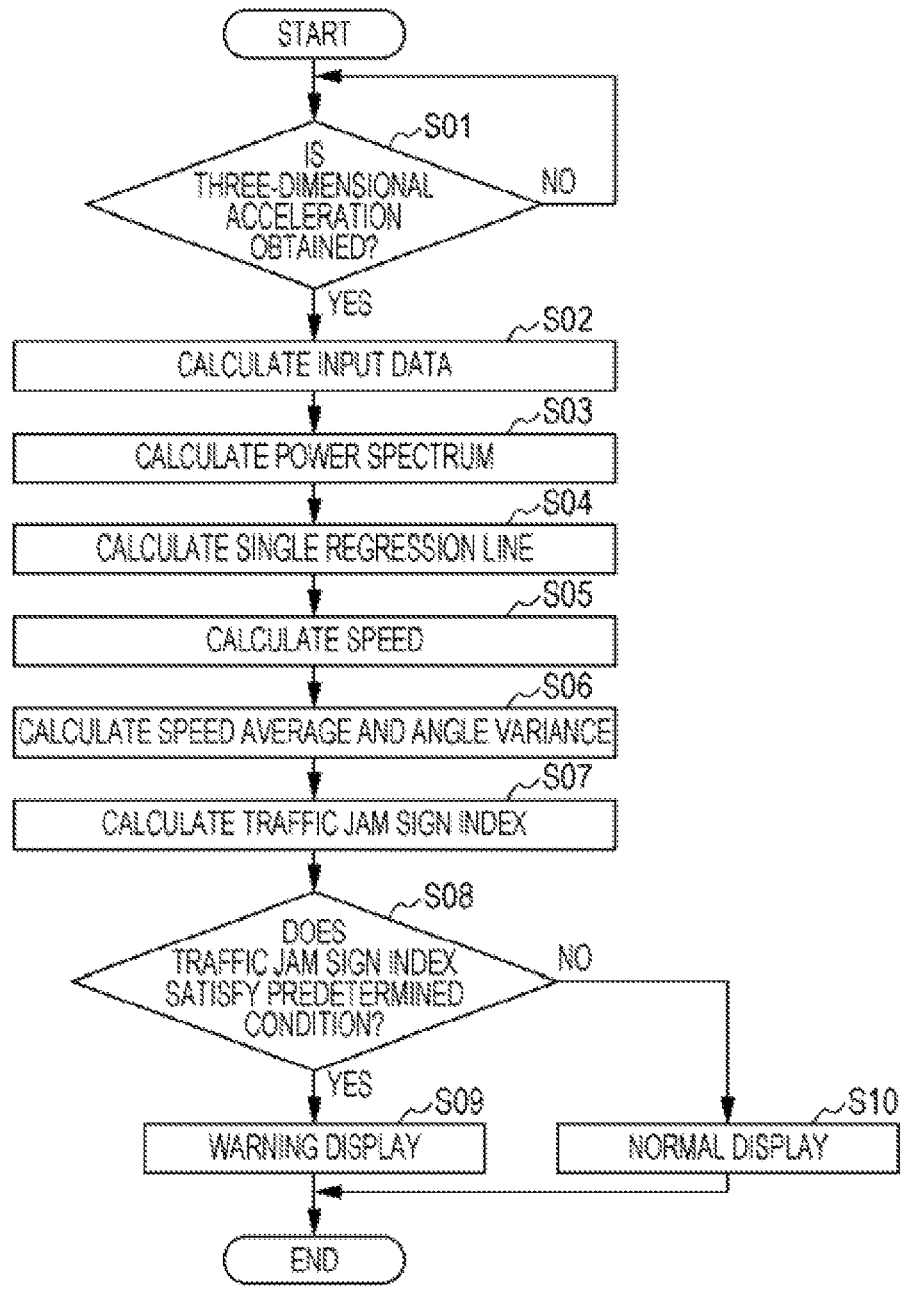
FIG. 8 is a flowchart illustrating the driving assistance method according to the embodiment.

First, at step S01 illustrated in FIG. 8, the equipment controller 17 determines whether or not the accelerations in the axial directions of the X axis, the Y axis and the Z axis are detected by the three-dimensional accelerometer 14.

If a result of determination is "NO," the equipment controller 17 repeatedly executes a determination process of step S01.

Meanwhile, if the result of determination is "YES," the equipment controller 17 causes processing to proceed to step S02.

Then, at step S02, the input data calculator 21 calculates the acceleration vector A in the three-dimensional space by using the accelerations in the axial directions of the X axis, the Y axis and the Z axis detected by the three-dimensional accelerometer 14. Then, the norm u of the difference (or the acceleration vector difference) ΔA between the acceleration vectors A at two different times with the time interval of the sampling period ΔT therebetween is calculated as input data.

Then, at step S03, the frequency analyzer 22 calculates the autocorrelation of input data by using the delay count appropriately settable by the operator in the input/output point appropriately settable by the operator. Then, the fast Fourier transform is performed on the autocorrelation to calculate the power spectrum (the acceleration spectrum).

Then, at step S04, the single regression line calculator 23 calculates the single regression line in the predetermined frequency range of the acceleration spectrum, and converts the inclination of the single regression line into information on the angle (or the spectrum angle) θ.

Then, at step S05, the speed calculator 20 calculates the speed V of the driving assistance apparatus 10 by using the accelerations in the axial directions of the X axis, the Y axis and the Z axis detected by the three-dimensional accelerometer 14.

Then, at step S06, the traffic jam sign index calculator 24 calculates the arithmetic mean μ (V) of the speed V by using the speed V sequentially calculated by the speed calculator 20 over a predetermined time. The traffic jam sign index calculator 24 calculates the variance σ (θ) of the angle θ by using the angle θ calculated by the single regression line calculator 23 over a predetermined time.

Then, at step S07, the traffic jam sign index calculator 24 calculates the product of the arithmetic mean μ (V) of the speed V and the variance σ (θ) of the angle θ (=μ (V)×σ (θ)), as the traffic jam sign index I to be inputted to the traffic jam prediction unit 25).

Then, at step S08, the traffic jam prediction unit 25 determines whether or not the traffic jam sign index I calculated by the traffic jam sign index calculator 24 satisfies the predetermined condition. For example, the traffic jam prediction unit 25 determines whether or not the traffic jam sign index I is equal to or more than the predetermined value Ia within each predetermined time. For example, the traffic jam prediction unit 25 determines whether or not the traffic jam sign index I decreases by the predetermined rate or more within each predetermined time. For example, the traffic jam prediction unit 25 determines whether or not the local maximum exists, by assigning the curve function to the time series data of the traffic jam sign index I sequentially calculated by the traffic jam sign index calculator 24.

If all results of determinations are "NO," the traffic jam prediction unit 25 causes processing to proceed to step S10.

Meanwhile, if at least any one of the results of determinations is "YES," the traffic jam prediction unit 25 causes processing to proceed to step S09.

Then, at step S09, the traffic jam prediction unit 25 gives a warning to the operator by the display device 16 and a speaker or the like, and the warning indicates that the traffic jam sign is sensed, that there is a situation where the traffic jam is prone to occur, and that there is a state in which a change in the traffic flow to a tendency toward the traffic jam is observed, or the like. Then, the traffic jam prediction unit 25 causes processing to proceed to "END."

Moreover, at step S10, the traffic jam prediction unit 25 gives information (normal information) to the operator by the display device 16 and the speaker or the like, and the information indicates that the traffic jam sign is not sensed, that there is not a situation where the traffic jam is prone to occur, and that there is not a state in which a change in the traffic flow to the tendency toward the traffic jam is observed, or the like. Then, the traffic jam prediction unit 25 causes the processing to proceed to "END."

As mentioned above, according to the driving assistance apparatus 10 and the driving assistance method of the embodiment, the use of the traffic jam sign index I having higher usefulness and stability for the sensing of the traffic jam sign, rather than an index susceptible to the disturbance, enables simply ensuring a desired sensing accuracy and reliability. The traffic jam sign index I which is the product of the arithmetic mean $\mu$ (V) of the speed V and the variance $\sigma$ ($\theta$) of the angle $\theta$ is an index which is unsusceptible to disturbance such as various traveling environments and driver's driving characteristics and is superior in sensitivity to the traffic jam sign, and can improve the sensing accuracy and reliability of the traffic jam sign.

Further, the use of the acceleration vector A in the three-dimensional space, which exhibits a sharper change for the traffic jam sign, enables improving resistance of the sensing of the traffic jam sign to the disturbance and thus improving the sensing accuracy, as compared to the use of information on acceleration only in a single axial direction or axial directions in a plane. The norm u of $\Delta A$ between the acceleration vectors A at two different times is used as input data for frequency analysis thereby to enable performing proper frequency analysis for acceleration generated in the driving assistance apparatus 10, regardless of the position and attitude of the driving assistance apparatus 10. Using an output from the three-dimensional accelerometer 14 mounted as a standard in the electronic equipment such for example as the portable information terminal and the mobile telephone terminal enables simply and accurately grasping the behavior of the vehicle moving together with the driving assistance apparatus 10, and thus enables improving convenience.

Further, since the traffic jam sign index I changes to a tendency to increase due to the traffic jam sign, if the traffic jam sign index I is equal to or more than the predetermined value Ia, the traffic jam prediction unit 25 determines that the traffic jam sign is sensed, thereby to enable simply and accurately sensing the traffic jam sign.

Further, since the traffic jam sign index I sharply decreases in the state immediately before the traffic jam, if the traffic jam sign index I decreases by the predetermined rate or more, the traffic jam prediction unit 25 determines that the traffic jam sign is sensed, thereby to enable simply and accurately sensing the traffic jam sign.

Further, since the curve function assigned to the time series data of the traffic jam sign index I becomes the local maximum due to the traffic jam sign, if the traffic jam sign index I is the local maximum, the traffic jam prediction unit 25 determines that the traffic jam sign is sensed, thereby to enable simply and accurately sensing the traffic jam sign. Since the occurrence of the traffic jam is periodic, the traffic jam sign index I is calculated at certain time intervals and the local maximum is extracted from a history of the traffic jam sign index I, thereby to enable simply sensing the traffic jam sign.

Figure 9:
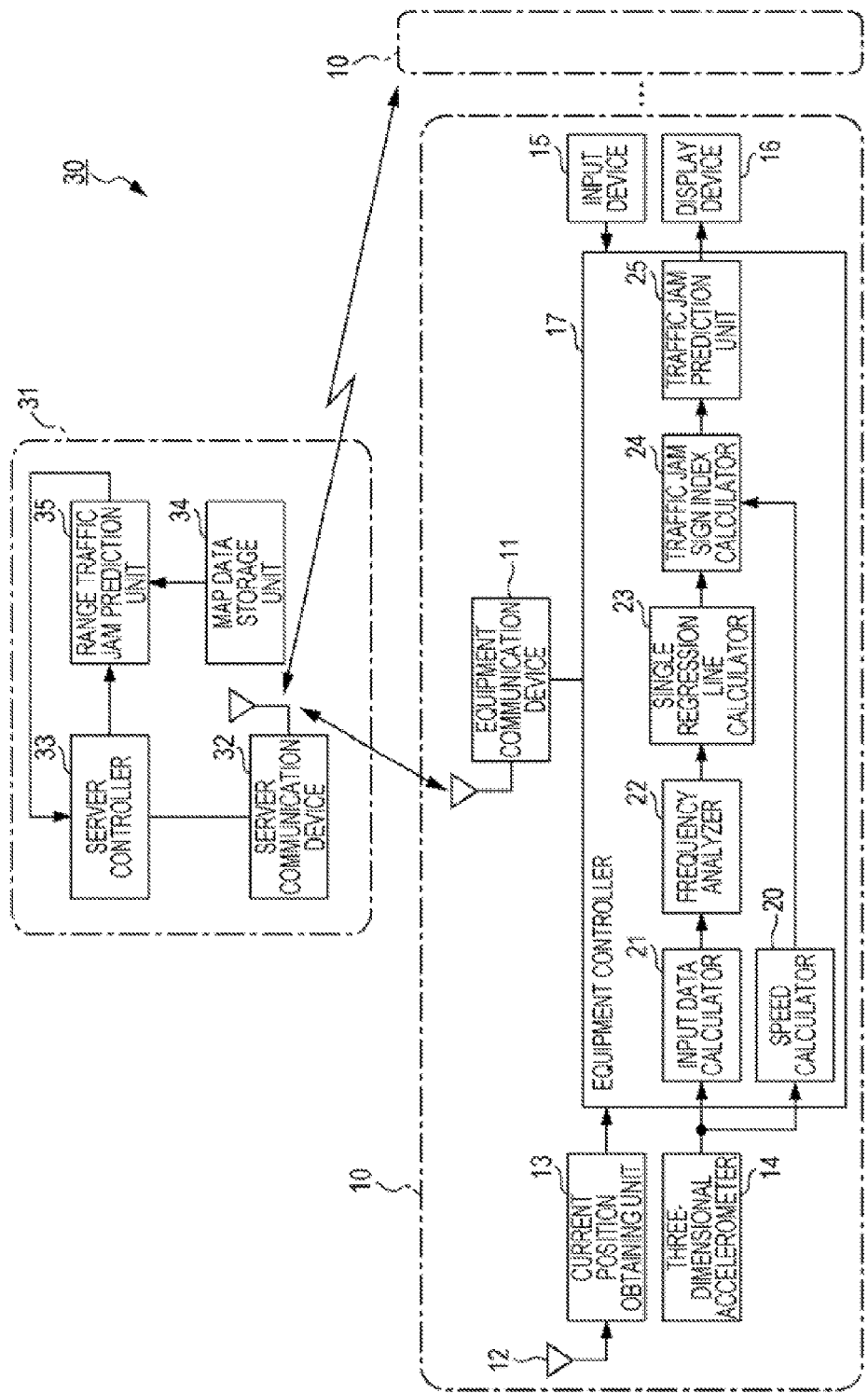
FIG. 9 is a block diagram of a driving assistance system for implementing a driving assistance method according to a modification of the embodiment.

In the above-mentioned embodiment, a driving assistance system 30 may be formed by at least one or more driving assistance apparatus 10 and a server device 31 communicable with the driving assistance apparatus 10, as is the case with a modification illustrated in FIG. 9, for example.

The server device 31 of the modification includes a server communication device 32, a server controller 33, a map data storage unit 34, and a range traffic jam prediction unit 35.

The server communication device 32 is capable of two-way communication with the equipment communication device 11 of the driving assistance apparatus 10 for example by radio communication in infrastructure mode, or communication between vehicles on the road via a road side communication device, or the like, and transmits and receives various types of information.

The server controller 33 outputs the various types of information received from the driving assistance apparatus 10 by the server communication device 32, to the range traffic jam prediction unit 35.

In the modification, the driving assistance apparatus 10 can transmit information based on the accelerations in the axial directions of the X axis, the Y axis and the Z axis detected by the three-dimensional accelerometer 14, to the server device 31. For example, the information includes information on the speed V calculated by the speed calculator 20, the spectrum angle $\theta$ calculated by the single regression line calculator 23, and the traffic jam sign index I calculated by the traffic jam sign index calculator 24, and the like. The information further includes a history of the current position obtained by the current position obtaining unit 13, and the like.

The map data storage unit 34 stores map data.

For example, the map data includes road coordinate data indicating on-road position coordinates required for processing for map matching based on information on the current position of the driving assistance apparatus 10, and road map data required to calculate a guide route. For example, the road map data includes a road condition such as a node, a link, a link cost, the shape of the road, the presence or absence of pavement, the presence or absence of unevenness on a road surface, and a traveling state of the vehicle, and the type of the road, and the like. The node is a coordinate point formed of the latitude and longitude of a predetermined spot on the road, such as an intersection and a branch point. The link is a line linking the nodes, and is a road section connecting the spots. The link cost is information indicating the distance of the road section corresponding to the link or the time required for movement in the road section.

The range traffic jam prediction unit 35 senses the traffic jam sign in a position range, for example by the number and ratio of the driving assistance apparatuses 10 in which the traffic jam sign index I received from the driving assistance apparatus 10 satisfies a predetermined condition, in the appropriate position range based on information on the current position received from at least one or more driving assistance apparatus 10. For example, the predetermined condition is at least any one of the fact that the traffic jam sign index I is equal to or more than the predetermined value Ia within the predetermined time, the fact that the traffic jam sign index I decreases by the predetermined rate or more within the predetermined time, and the fact that the traffic jam sign index I becomes the local maximum within the predetermined time, and the like.

The driving assistance system 30 for implementing the driving assistance method according to the modification includes the above-described configuration, and next, description will be given with regard to operation of the driving assistance system 30, in particular, operation of the driving assistance apparatus 10.

Figure 10:
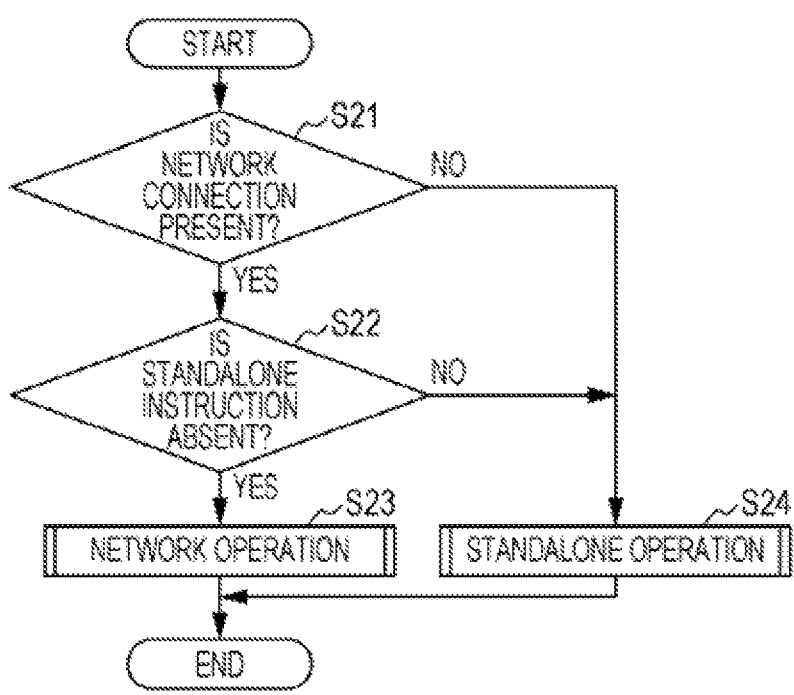
FIG. 10 is a flowchart illustrating the driving assistance method according to the modification of the embodiment.

First, at step S21 illustrated in FIG. 10, the server controller 33 determines whether or not the driving assistance apparatus 10 is connected to a communication network such as a radio communication network system and is properly connectable to the server device 31 via the communication network without poor communication.

If a result of determination is "NO," the server controller 33 repeatedly executes processing of step S21.

Meanwhile, if the result of determination is "YES," the server controller 33 causes processing to proceed to step S22.

Then, at step S22, the server controller 33 determines whether or not an instruction to execute a standalone operation independent of an external device such as the server device 31 is generated by an operator's instruction or the like.

If a result of determination is "YES," that is, if the instruction to execute the standalone operation is absent, the server controller 33 causes the processing to proceed to step S23. At step S23, the server controller 33 executes a network operation to be mentioned below, and brings the processing to an end.

Meanwhile, if the result of determination is "NO," the server controller 33 causes the processing to proceed to step S24. At step S24, the server controller 33 executes the processing of steps S01 to S20 of the above-mentioned embodiment as the standalone operation.

Description will be given below with regard to the network operation at step S23 mentioned above.

Figure 11:
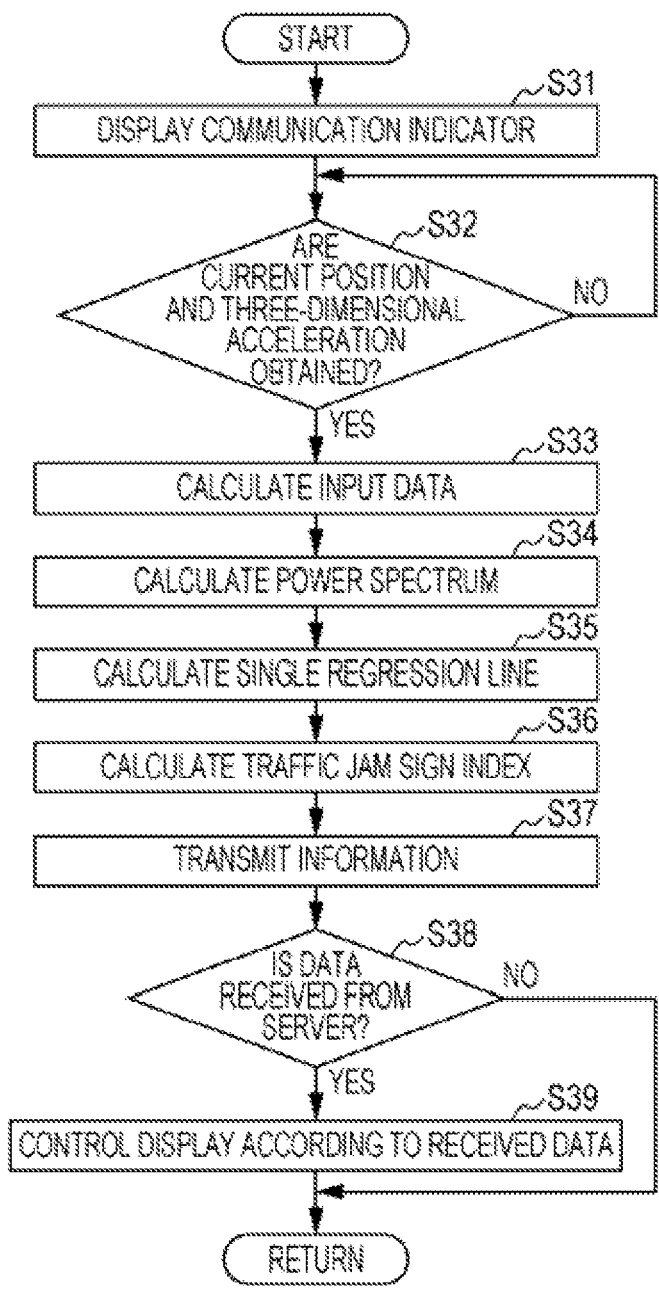
FIG. 11 is a flowchart illustrating a network operation illustrated in FIG. 10.

First, at step S31 illustrated in FIG. 11, the equipment controller 17 causes the display device 16 to display a predetermined communication indicator. The equipment controller 17 provides the communication indicator indicating that the driving assistance apparatus 10 is connected to the communication network such as the radio communication network system and is properly connectable to the server device 31 via the communication network without poor communication.

Then, at step S32, the equipment controller 17 determines whether or not the accelerations in the axial directions of the X axis, the Y axis and the Z axis are detected by the three-dimensional accelerometer 14 and information on the current position is obtained by the current position obtaining unit 13.

If a result of determination is "NO," the equipment controller 17 repeatedly executes a determination process of step S32.

Meanwhile, if the result of determination is "YES," the equipment controller 17 causes processing to proceed to step S33.

Then, at step S33, the input data calculator 21 calculates the acceleration vector A in the three-dimensional space by using the accelerations in the axial directions of the X axis, the Y axis and the Z axis detected by the three-dimensional accelerometer 14. Then, the norm u of the difference (or the acceleration vector difference) $\Delta A$ between the acceleration vectors A at two different times with the time interval of the sampling period $\Delta T$ therebetween is calculated as input data.

Then, at step S34, the frequency analyzer 22 calculates the autocorrelation of input data by using the delay count appropriately settable by the operator in the input/output point appropriately settable by the operator. Then, the fast Fourier transform is performed on the autocorrelation to calculate the power spectrum (the acceleration spectrum).

Then, at step S35, the single regression line calculator 23 calculates the single regression line in the predetermined frequency range of the acceleration spectrum, and converts the inclination of the single regression line into information on the angle (or the spectrum angle) $\theta$.

Then, at step S36, the speed calculator 20 calculates the speed V of the driving assistance apparatus 10 by using the accelerations in the axial directions of the X axis, the Y axis and the Z axis detected by the three-dimensional accelerometer 14. Then, the traffic jam sign index calculator 24 calculates the arithmetic mean $\mu$ (V) of the speed V by using the speed V sequentially calculated by the speed calculator 20 over the predetermined time. The traffic jam sign index calculator 24 calculates the variance $\sigma(\theta)$ of the angle $\theta$ by using the angle $\theta$ calculated by the single regression line calculator 23 over the predetermined time. Then, the traffic jam sign index calculator 24 calculates the product of the arithmetic mean $\mu$ (V) of the speed V and the variance $\sigma(\theta)$ of the angle $\theta$ ($=\mu$ (V)$\times \sigma(\theta)$), as the traffic jam sign index I.

Then, at step S37, the equipment controller 17 transmits the spectrum angle $\theta$, the speed V, the traffic jam sign index I calculated by the traffic jam sign index calculator 24, and the information on the current position, and the like, to the server device 31 via the equipment communication device 11.

Then, at step S38, the equipment controller 17 determines whether or not information on the traffic jam sign in an appropriate position range sensed by the server device 31 is received from the server device 31.

If a result of determination is "NO," the equipment controller 17 brings a series of processes to an end.

Meanwhile, if the result of determination is "YES," the equipment controller 17 causes processing to proceed to step S39.

Then, at step S39, the equipment controller 17 controls the display device 16 and the speaker or the like so as to present the information on the traffic jam sign received from the server device 31. Then, the equipment controller 17 causes the processing to proceed to "RETURN."

According to the driving assistance system 30 and the driving assistance method according to the modification, the information on the traffic jam sign index I is obtained from the plural driving assistance apparatuses 10, and the plural driving assistance apparatuses 10 can present the information on the traffic jam sign in real time and in a collective manner. This enables improving operation efficiency, as compared to, for example, a case where each driving assistance apparatus 10 presents the information on the traffic jam sign.

In the driving assistance apparatus 10 according to the above-mentioned embodiment, the traffic jam sign index calculator 24 calculates the arithmetic mean $\mu$ (V) of the speed V as the value associated with the speed V; however, the embodiment is not so limited. The traffic jam sign index calculator 24 may use, for example, other mean values, a median, a modal value, or the like as an average value of the speed V.

Moreover, the traffic jam sign index calculator 24 calculates the variance $\sigma(\theta)$ of the angle $\theta$ as the value associated with the degree of variation in the angle $\theta$; however, the embodiment is not so limited. The traffic jam sign index calculator 24 may use, for example, a standard deviation or the like as the value associated with the degree of variation in the angle $\theta$.

In the driving assistance apparatus 10 according to the above-mentioned embodiment, the speed calculator 20 calculates the speed V of the driving assistance apparatus 10 by using the accelerations in the axial directions of the X axis, the Y axis and the Z axis detected by the three-dimensional accelerometer 14; however, the embodiment is not so limited.

In the modification of the embodiment, the driving assistance apparatus 10 may obtain speed information from a speed sensor mounted on the vehicle.

In the driving assistance apparatus 10 according to the above-mentioned embodiment, the traffic jam prediction unit 25 determines whether or not the traffic jam sign index I decreases by the predetermined rate or more within each predetermined time; however, the embodiment is not so limited.

In the modification of the embodiment, the traffic jam prediction unit 25 may determine whether or not an absolute value or a relative value of the degree of decrease in the traffic jam sign index I is equal to or more than a predetermined value within each predetermined time.

In the driving assistance apparatus 10 according to the above-mentioned embodiment, data on the predetermined value Ia for the magnitude of the traffic jam sign index I and a predetermined rate for the rate of decrease in the traffic jam sign index I may be preset based on the road type (such as a highway and a general road).

The driving assistance apparatus 10 and the server device 31 of the driving assistance system 30 according to the above-mentioned embodiment and the modification may be implemented as specifically designed hardware, or the following configuration may be adopted: a program for implementing functions of the driving assistance apparatus 10 and the server device 31 is recorded in a computer-readable recording medium, and the program recorded in the recording medium is loaded into and executed by a computer system thereby to operate as the driving support apparatus 10 and the server device 31. As employed herein, the computer system is defined as including hardware such as an OS or peripheral equipment. Also, the computer system is defined as including a WWW system including a homepage providing environment (or display environment).

Moreover, the computer-readable recording medium refers to a potable medium such as a flexible disk, a magneto-optical disk, a ROM (read only memory), or a CD-ROM (compact disc read only memory), or a storage device such as a hard disk contained in the computer system. Further, the computer-readable recording medium is defined as including what holds the program during a certain time, as is the case with a volatile memory (RAM (random access memory)) internal to the computer system which serves as a server or a client in a case where the program is transmitted via a network such as the Internet or a communication line such as a telephone line.

Moreover, the above-described program may be transmitted from the computer system in which the program is stored in the storage device or the like, to other computer systems, via a transmission medium or by a transmission wave in the transmission medium. As employed herein, the transmission medium for transmission of the program refers to a medium having the function of transmitting information, as is the case with the network (communication network) such as the Internet or the communication line such as the telephone line.

Moreover, the above-described program may be intended to implement part of the above-mentioned function. Further, the program may be configured as what is capable of implementing the above-mentioned function in combination with a program already recorded in the computer system, that is, a so-called differential file (or a differential program).

The above-mentioned embodiment is provided by way of example and is not intended to limit the scope of the disclosure. The above-mentioned novel embodiment may be carried out in various other forms, and various omissions, substitutions, and changes could be made hereto without departing from the spirit of the disclosure. The above-mentioned embodiment and its modification are included in the scope and spirit of the disclosure and are included in the scope of the disclosure recited in the appended claims and its equivalence. For example, in the above-described embodiment, there is given an example in which the server device 31 is configured as a single device; however, the server device may be configured as plural devices connected via the communication line or the like.

What is claimed is:

1. A driving assistance method for presenting traffic jam prediction information to a driver in a vehicle, the method executed by a computer of an electronic equipment, comprising:
    an acceleration information obtaining step of obtaining acceleration information of the vehicle;
    a power spectrum calculation step of calculating a power spectrum corresponding to a frequency by a frequency analysis of the acceleration information;
    an angle information obtaining step of calculating a single regression line of the power spectrum, and obtaining regression-line-angle information related to an angle of an inclination of the single regression line in a predetermined range of the frequency;
    a speed obtaining step of obtaining a speed of the vehicle;
    a traffic jam sign index calculation step of detecting a degree of variation in the angle of the inclination of the single regression line in the regression-line-angle information, and calculating a traffic jam sign index which is a product of a value associated with the degree of variation in the angle and a value associated with the speed;
    a traffic jam sign detecting step of detecting a traffic jam sign based on a change in the traffic jam sign index within a predetermined time; and
    a controlling step of controlling a display device to present to the driver the traffic jam prediction information based on the traffic jam sign detected in the traffic jam sign detecting step.

2. The driving assistance method according to claim 1,
    wherein the acceleration information obtaining step comprises obtaining the acceleration information represented by accelerations in axial directions of first to third axes which form orthogonal coordinate systems in a three-dimensional space,
    wherein the power spectrum calculation step comprises calculating vectors of the accelerations in the three-dimensional space by using the acceleration information on the accelerations in each axial direction, calculating input data which is a norm of a difference between the vectors at two different times, calculating an autocorrelation of the input data, and performing a Fourier transform on the autocorrelation, thereby calculating the power spectrum.

3. The driving assistance method according to claim 1, wherein the traffic jam sign detecting step comprises detecting the traffic jam sign when the traffic jam sign index is equal to or higher than a predetermined value within the predetermined time.

4. The driving assistance method according to claim 1, wherein the traffic jam sign detecting step comprises detecting the traffic jam sign when the traffic jam sign index decreases by a predetermined rate or more within the predetermined time.

5. The driving assistance method according to claim 1, wherein the traffic jam sign detecting step comprises detecting the traffic jam sign when the traffic jam sign index becomes a local maximum within the predetermined time.

6. A non-transitory computer readable recording medium executable by a computer of an electronic equipment to perform steps for presenting traffic jam prediction information to a driver in a vehicle, the steps comprising:
    an acceleration information obtaining step of obtaining acceleration information of the vehicle;

a power spectrum calculation step of calculating a power spectrum corresponding to a frequency by a frequency analysis of the acceleration information;

an angle information obtaining step of calculating a single regression line of the power spectrum and obtaining regression-line-angle information related to an angle of an inclination of the single regression line in a predetermined range of the frequency;

a speed obtaining step of obtaining a speed of the vehicle;

a traffic jam sign index calculation step of detecting a degree of variation in the angle of the inclination of the single regression line in the regression-line-angle information and calculating a traffic jam sign index which is a product of a value associated with the degree of variation in the angle and a value associated with the speed;

a traffic jam sign detecting step of detecting a traffic jam sign based on a change in the traffic jam sign index within a predetermined time; and a controlling step of controlling a display device to present to the driver the traffic jam prediction information based on the traffic jam sign detected in the traffic jam sign detecting step.

7. The non-transitory computer readable recording medium according to claim 6, wherein the computer of the electronic equipment is configured to obtain the acceleration information represented by accelerations in axial directions of first to third axes which form orthogonal coordinate systems in a three-dimensional space, and to, in the power spectrum calculation step, calculate vectors of the accelerations in the three-dimensional space by using the acceleration information on the accelerations in each axial direction, calculate input data which is a norm of a difference between the vectors at two different times, calculate an autocorrelation of the input data, and perform a Fourier transform on the autocorrelation, thereby calculating the power spectrum.

8. The non-transitory computer readable recording medium according to claim 6, wherein the computer of the electronic equipment is configured to in the traffic jam sign detecting step, detect the traffic jam sign when the traffic jam sign index is equal to or higher than a predetermined value within the predetermined time.

9. The non-transitory computer readable recording medium according to claim 6, wherein the computer of the electronic equipment is configured to, in the traffic jam sign detecting step, detect the traffic jam sign when the traffic jam sign index decreases by a predetermined rate or more within the predetermined time.

10. The non-transitory computer readable recording medium according to claim 6, wherein the computer of the electronic equipment is configured to, in the traffic jam sign detecting step, detect the traffic jam sign when the traffic jam sign index becomes a local maximum within the predetermined time.

11. A driving assistance apparatus comprising:

a controller configured to obtain acceleration information of a vehicle; and a display device configured to present traffic jam prediction information to a driver in the vehicle, wherein the controller is further configured to:

calculate a power spectrum corresponding to a frequency by a frequency analysis of the acceleration information;

calculate a single regression line of the power spectrum and obtain regression-line-angle information related to an angle of an inclination of the single regression line in a predetermined range of the frequency;

obtain a speed of the vehicle;

detect a degree of variation in the angle of the inclination of the single regression line in the regression-line-angle information, and calculate a traffic jam sign index which is a product of a value associated with a degree of variation in the angle and a value associated with the speed;

detect a traffic jam sign based on a change in the traffic jam sign index within a predetermined time; and control the display device to present to the driver the traffic jam prediction information based on the traffic jam sign detected by the controller.

12. The driving assistance apparatus according to claim 11, wherein the controller obtains the acceleration information represented by accelerations in axial directions of first to third axes which form orthogonal coordinate systems in a three-dimensional space, wherein the controller calculates vectors of the accelerations in the three-dimensional space by using the acceleration information on the accelerations in each axial direction, calculates input data which is a norm of a difference between the vectors at two different times, calculates an autocorrelation of the input data, and performs a Fourier transform on the autocorrelation, thereby calculating the power spectrum.

13. The driving assistance apparatus according to claim 11, wherein the controller detects the traffic jam sign when the traffic jam sign index is equal to or higher than a predetermined value within the predetermined time.

14. The driving assistance apparatus according to claim 11, wherein the controller detects the traffic jam sign when the traffic jam sign index decreases by a predetermined rate or more within the predetermined time.

15. The driving assistance apparatus according to claim 11, wherein the controller detects the traffic jam sign when the traffic jam sign index becomes a local maximum within the predetermined time.

* * * * *